United States Patent
S Bykampadi et al.

(10) Patent No.: US 12,425,857 B2
(45) Date of Patent: Sep. 23, 2025

(54) SECURITY MANAGEMENT BETWEEN EDGE PROXY AND INTERNETWORK EXCHANGE NODE IN A COMMUNICATION SYSTEM

(71) Applicant: Nokia Technologies Oy, Espoo (FI)

(72) Inventors: Nagendra S Bykampadi, Bangalore (IN); Anja Jerichow, Grafing bei München (DE); Suresh Nair, Whippany, NJ (US)

(73) Assignee: Nokia Technologies Oy, Espoo (FI)

( * ) Notice: Subject to any disclaimer, the term of this patent is extended or adjusted under 35 U.S.C. 154(b) by 732 days.

(21) Appl. No.: 17/253,895

(22) PCT Filed: Sep. 20, 2019

(86) PCT No.: PCT/FI2019/050673
§ 371 (c)(1),
(2) Date: Dec. 18, 2020

(87) PCT Pub. No.: WO2020/065130
PCT Pub. Date: Apr. 2, 2020

(65) Prior Publication Data
US 2021/0219137 A1 Jul. 15, 2021

(30) Foreign Application Priority Data
Sep. 24, 2018 (IN) .............................. 201841035941

(51) Int. Cl.
*H04W 12/086* (2021.01)
*H04L 9/40* (2022.01)
(Continued)

(52) U.S. Cl.
CPC ....... *H04W 12/086* (2021.01); *H04L 63/0272* (2013.01); *H04L 63/0281* (2013.01);
(Continued)

(58) Field of Classification Search
CPC . H04W 12/086; H04W 12/033; H04W 76/12; H04W 88/16; H04L 63/0272; H04L 63/02815; H04L 63/166; H04L 67/02
See application file for complete search history.

(56) References Cited

U.S. PATENT DOCUMENTS 10,812,448 B2 * 10/2020 Gupta .................. H04L 61/301
11,050,788 B2 * 6/2021 Livanos ................ H04W 48/16
(Continued)

FOREIGN PATENT DOCUMENTS

WO WO-2020001300 A1 * 1/2020 ......... H04L 63/0281
WO WO-2020094547 A1 * 5/2020 .......... H04L 61/4511

OTHER PUBLICATIONS

Office action received for corresponding Indian Patent Application No. 201841035941, dated Nov. 28, 2022, 6 pages.
(Continued)

*Primary Examiner* — Steven S Kelley
(74) *Attorney, Agent, or Firm* — Ryan, Mason & Lewis, LLP (57) ABSTRACT

In one example, a method initiates establishment of a secure tunnel by a security proxy element (e.g., SEPP) in a first communication network (e.g., VPLMN) with an internetwork exchange element (e.g., IPX node) which is operatively coupled between the first communication network and a second communication network (e.g., HPLMN). Upon establishment of the secure tunnel, the method sends a message from the security proxy element to the internetwork exchange element over the secure tunnel. The secure tunnel can be a VPN tunnel and can be established using TLS or IPsec. In one example, the internetwork exchange node functions as an HTTP proxy, and in another embodiment as an interception (e.g., MITM) proxy. In another example, HTTPS is used to establish a separate TLS connection for each HTTP message. In yet another example, the security
(Continued)

proxy element is configured to select (and change as needed) the secure communication mechanism.

16 Claims, 5 Drawing Sheets

(51) Int. Cl.
| | |
|---|---|
| *H04L 67/02* | (2022.01) |
| *H04W 12/033* | (2021.01) |
| *H04W 76/12* | (2018.01) |
| *H04W 88/16* | (2009.01) |

(52) U.S. Cl.
CPC ......... *H04L 63/166* (2013.01); *H04W 12/033* (2021.01); *H04W 76/12* (2018.02); *H04W 88/16* (2013.01); *H04L 67/02* (2013.01)

(56) References Cited

U.S. PATENT DOCUMENTS

| | | | | |
|---|---|---|---|---|
| 11,076,281 | B1* | 7/2021 | Yau | H04W 8/12 |
| 11,792,163 | B2* | 10/2023 | Bykampadi | H04L 63/20 |
| | | | | 726/12 |
| 2005/0174984 | A1* | 8/2005 | O'Neill | H04W 8/12 |
| | | | | 370/349 |
| 2015/0242903 | A1* | 8/2015 | Peebles | H04W 4/24 |
| | | | | 705/14.64 |
| 2016/0197933 | A1* | 7/2016 | Lapidous | H04L 63/0471 |
| | | | | 726/26 |
| 2016/0277359 | A1* | 9/2016 | Karunakaran | H04W 12/03 |
| 2016/0381725 | A1 | 12/2016 | Spinelli et al. | |
| 2017/0231020 | A1 | 8/2017 | Tomici et al. | |
| 2019/0238504 | A1* | 8/2019 | Gupta | H04L 61/4511 |
| 2020/0036754 | A1* | 1/2020 | Livanos | H04W 48/16 |
| 2021/0014680 | A1* | 1/2021 | Saarinen | H04W 12/03 |
| 2021/0029177 | A1* | 1/2021 | S Bykampadi | G06F 21/10 |
| 2021/0029616 | A1* | 1/2021 | Faus Gregori | H04L 45/20 |
| 2021/0044569 | A1* | 2/2021 | Xu | H04L 67/564 |
| 2021/0203643 | A1* | 7/2021 | Jost | H04W 12/122 |
| 2021/0243165 | A1* | 8/2021 | Bykampadi | H04L 63/20 |
| 2021/0282078 | A1* | 9/2021 | Martinez De La Cruz | |
| | | | | H04W 8/28 |
| 2022/0022040 | A1* | 1/2022 | Mahalank | H04W 12/08 |

OTHER PUBLICATIONS

"3rd Generation Partnership Project; Technical Specification Group Services and System Aspects; Security architecture and procedures for 5G system(Release 15)", 3GPP TS 33.501, V15.1.0, Jun. 2018, pp. 1-152.

"3rd Generation Partnership Project; Technical Specification Group Core Network and Terminals; 5G System; Technical Realization of Service Based Architecture; Stage 3 (Release 15)", 3GPP TS 29.500, V15.0.0, Jun. 2018, pp. 1-28.

"3rd Generation Partnership Project; Technical Specification Group Services and System Aspects; Procedures for the 5G System; Stage 2 (Release 15)", 3GPP TS 23.502, V15.3.0, Sep. 2018, pp. 1-330.

"3rd Generation Partnership Project; Technical Specification Group Services and System Aspects; System Architecture for the 5G System; Stage 2 (Release 15)", 3GPP TS 23.501, V15.2.0, Jun. 2018, pp. 1-217.

Belshe et al., "Hypertext Transfer Protocol Version 2 (HTTP/2)", RFC 7540, Internet Engineering Task Force (IETF), May 2015, pp. 1-96.

"3rd Generation Partnership Project; Technical Specification Group Core Network and Terminals; 5G System; Technical Realization of Service Based Architecture; Stage 3 (Release 15)", 3GPP TS 29.500, V15.1.0, Sep. 2018, pp. 1-29.

International Search Report and Written Opinion received for corresponding Patent Cooperation Treaty Application No. PCT/FI2019/050673, dated Dec. 12, 2019, 16 pages.

"Living Document: Security of Service Based Architecture of 5G phase 1", 3GPP TSG SA WG3 (Security) Meeting #91BIS, S3-181945, Agenda : 7.2.13.2, China Mobile, May 21-25, 2018, 28 pages.

"3rd Generation Partnership Project; Technical Specification Group Services and System Aspects; Security architecture and procedures for 5G system (Release 15)", 3GPP TS 33.501, V15.2.0, Sep. 2018, pp. 1-175.

* cited by examiner

SECURITY MANAGEMENT BETWEEN EDGE PROXY AND INTERNETWORK EXCHANGE NODE IN A COMMUNICATION SYSTEM

RELATED APPLICATION

This application claims priority to PCT Application No. PCT/FI2019/050673, filed on Sep. 20, 2019, which claims priority to India application No. 201841035941, filed on Sep. 24, 2018, each of which is incorporated herein by reference in its entirety.

FIELD

The field relates generally to communication systems, and more particularly, but not exclusively, to security management within such systems.

BACKGROUND

This section introduces aspects that may be helpful to facilitating a better understanding of the inventions. Accordingly, the statements of this section are to be read in this light and are not to be understood as admissions about what is in the prior art or what is not in the prior art.

Fourth generation (4G) wireless mobile telecommunications technology, also known as Long Term Evolution (LTE) technology, was designed to provide high capacity mobile multimedia with high data rates particularly for human interaction. Next generation or fifth generation (5G) technology is intended to be used not only for human interaction, but also for machine type communications in so-called Internet of Things (IoT) networks.

While 5G networks are intended to enable massive IT services (e.g., very large numbers of limited capacity devices) and mission-critical IoT services (e.g., requiring high reliability), improvements over legacy mobile communication services are supported in the form of enhanced mobile broadband (eMBB) services providing improved wireless Internet access for mobile devices.

In an example communication system, user equipment (5G UE in a 5G network or, more broadly, a UE) such as a mobile terminal (subscriber) communicates over an air interface with a base station or access point referred to as a gNB in a 5G network. The access point (e.g., gNB) is illustratively part of an access network of the communication system. For example, in a 5G network, the access network is referred to as a 5G System and is described in 5G Technical Specification (TS) 23.501, V15.2.0, entitled "Technical Specification Group Services and System Aspects; System Architecture for the 5G System," the disclosure of which is incorporated by reference herein in its entirety. In general, the access point (e.g., gNB) provides access for the UE to a core network (CN), which then provides access for the UE to other UEs and/or a data network such as a packet data network (e.g., Internet).

TS 23.501 goes on to define a 5G Service-Based Architecture (SBA) which models services as network functions (NFs) that communicate with each other using representational state transfer application programming interfaces (Restful APIs).

Furthermore, 5G Technical Specification (TS) 33.501, V15.1.0, entitled "Technical Specification Group Services and System Aspects; Security Architecture and Procedures for the 5G System," the disclosure of which is incorporated by reference herein in its entirety, further describes security management details associated with a 5G network.

Security management is an important consideration in any communication system. For example, security of communications between two networks (e.g., a visited network of mobile subscriber and the home network of the mobile subscriber) is one example of security management in a 5G network. However, security of such internetwork communications presents several challenges in existing 5G approaches.

SUMMARY

Illustrative embodiments provide improved techniques for security management in communication systems particularly with respect to internetwork communications.

For example, in one illustrative embodiment, a method comprises initiating establishment of a secure tunnel by a security proxy element in a first communication network with an internetwork exchange element which is operatively coupled between the first communication network and a second communication network. Upon establishment of the secure tunnel, the method sends a message from the security proxy element to the internetwork exchange element over the secure tunnel. The secure tunnel is a virtual private network (VPN) tunnel in one or more embodiments and is established using a transport layer security (TLS) protocol or an internet protocol security (IPsec) protocol. In one embodiment, the internetwork exchange node functions as a hypertext transfer protocol (HTTP) proxy, and in another embodiment as an interception proxy.

In a further embodiment, a method comprises initiating establishment of one or more transport layer-based security connections, using a secure hypertext-based transfer protocol, by a security proxy element in a first communication network with an internetwork exchange element which is operatively coupled between the first communication network and a second communication network, wherein each of the one or more transport layer-based security connections corresponds to one or more hypertext-based transfer protocol connections. Upon establishment of the one or more transport layer security connections, the method sends one or more messages corresponding to the one or more hypertext-based transfer protocol connections from the security proxy element to the internetwork exchange over the one or more transport layer security connections. In one or more embodiments, the secure hypertext-based transfer protocol is the HTTPS protocol, the transport layer-based security connections are TLS connections, and the hypertext-based transfer protocol connections are HTTP connections.

In another embodiment, a method comprises selecting, by a security proxy element in a first communication network, from a plurality of secure communication mechanisms a secure communication mechanism with which to communicate with an internetwork exchange element which is operatively coupled between the first communication network and a second communication network over a roaming interface. The security proxy element then initiates establishment of the selected secure communication mechanism with the internetwork exchange element. In some embodiments, the security proxy element is configured to change the selected secure communication mechanism as needed.

One or more illustrative embodiments are implemented in a roaming scenario involving multiple communication networks (e.g. visited and home public land mobile networks).

Further illustrative embodiments are provided in the form of non-transitory computer-readable storage medium having embodied therein executable program code that when executed by a processor causes the processor to perform the above steps. Still further illustrative embodiments comprise apparatus with a processor and a memory configured to perform the above steps.

These and other features and advantages of embodiments described herein will become more apparent from the accompanying drawings and the following detailed description.

DETAILED DESCRIPTION

Embodiments will be illustrated herein in conjunction with example communication systems and associated techniques for providing security management in communication systems. It should be understood, however, that the scope of the claims is not limited to particular types of communication systems and/or processes disclosed. Embodiments can be implemented in a wide variety of other types of communication systems, using alternative processes and operations. For example, although illustrated in the context of wireless cellular systems utilizing 3GPP system elements such as a 3GPP next generation system (5G), the disclosed embodiments can be adapted in a straightforward manner to a variety of other types of communication systems.

In accordance with illustrative embodiments implemented in a 5G communication system environment, one or more 3GPP technical specifications (TS) and technical reports (TR) provide further explanation of user equipment and network elements/functions and/or operations that interact with one or more illustrative embodiments, e.g., the above-referenced 3GPP TS 23.501 and 3GPP TS 33.501. Other 3GPP TS/TR documents provide other conventional details that one of ordinary skill in the art will realize. However, while illustrative embodiments are well-suited for implementation associated with the above-mentioned 5G-related 3GPP standards, alternative embodiments are not necessarily intended to be limited to any particular standards.

Furthermore, illustrative embodiments will be explained herein in the context of the Open Systems Interconnection model (OSI model) which is a model that conceptually characterizes communication functions of a communication system such as, for example, a 5G network. The OSI model is typically conceptualized as a hierarchical stack with a given layer serving the layer above and being served by the layer below. Typically, the OSI model comprises seven layers with the top layer of the stack being the application layer (layer 7) followed by the presentation layer (layer 6), the session layer (layer 5), the transport layer (layer 4), the network layer (layer 3), the data link layer (layer 2), and the physical layer (layer 1). One of ordinary skill in the art will appreciate the functions and interworkings of the various layers and, thus, further details of each layer are not described herein. However, it is to be appreciated that while illustrative embodiments are well-suited for implementations that utilize an OSI model, alternative embodiments are not necessarily limited to any particular communication function model.

Illustrative embodiments are related to security management associated with the Service-Based Architecture (SBA) for 5G networks. Prior to describing such illustrative embodiments, a general description of main components of a 5G network will be described below in the context of FIGS. 1 and 2.

Figure 1:
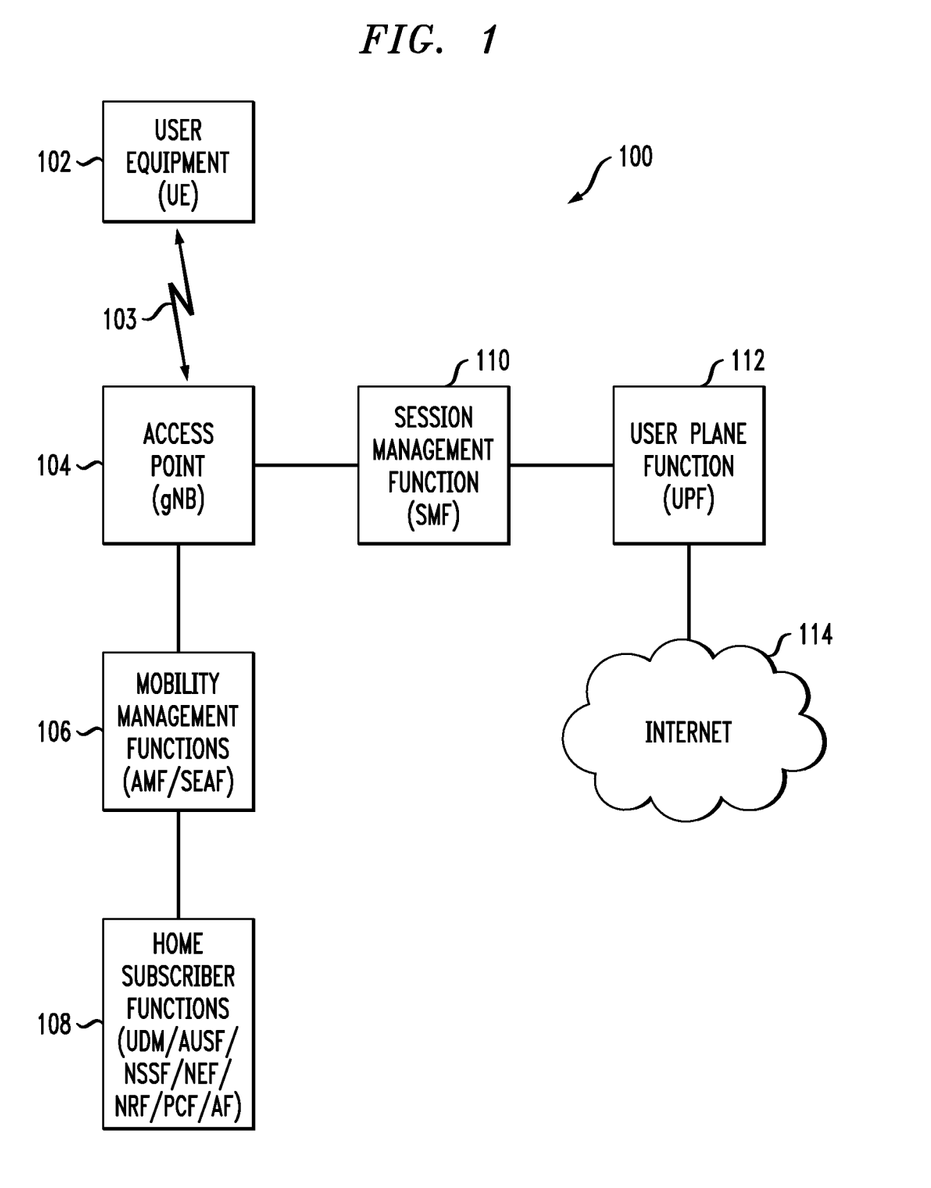
FIG. 1 illustrates a communication system with which one or more illustrative embodiments are implemented.

FIG. 1 shows a communication system 100 within which illustrative embodiments are implemented. It is to be understood that the elements shown in communication system 100 are intended to represent main functions provided within the system, e.g., UE access functions, mobility management functions, authentication functions, serving gateway functions, etc. As such, the blocks shown in FIG. 1 reference specific elements in 5G networks that provide these main functions. However, other network elements are used in other embodiments to implement some or all of the main functions represented. Also, it is to be understood that not all functions of a 5G network are depicted in FIG. 1. Rather, functions that facilitate an explanation of illustrative embodiments are represented. Subsequent figures depict some additional elements/functions.

Accordingly, as shown, communication system 100 comprises user equipment (UE) 102 that communicates via an air interface 103 with an access point (gNB) 104. The UE 102 in some embodiments is a mobile station, and such a mobile station may comprise, by way of example, a mobile telephone, a computer, or any other type of communication device. The term "user equipment" as used herein is therefore intended to be construed broadly, so as to encompass a variety of different types of mobile stations, subscriber stations or, more generally, communication devices, including examples such as a combination of a data card inserted in a laptop or other equipment such as a smart phone or other cellular device. In one or more illustrative embodiments, user equipment refers to an IoT device and/or a device that executes ultra-reliable low latency communication (URLLC) application software where computing resources on the UE are limited or performance and timing requirements are very stringent. Such communication devices are also intended to encompass devices commonly referred to as access terminals.

In one embodiment, UE 102 is comprised of a Universal Integrated Circuit Card (UICC) part and a Mobile Equipment (ME) part. The UICC is the user-dependent part of the UE and contains at least one Universal Subscriber Identity Module (USIM) and appropriate application software. The USIM securely stores the permanent subscription identifier and its related key, which are used to identify and authenticate subscribers to access networks. The ME is the user-independent part of the UE and contains terminal equipment (TE) functions and various mobile termination (MT) functions.

Note that, in one example, the permanent subscription identifier is an International Mobile Subscriber Identity (IMSI) of a UE. In one embodiment, the IMSI is a fixed 15-digit length and consists of a 3-digit Mobile Country Code (MCC), a 3-digit Mobile Network Code (MNC), and a 9-digit Mobile Station Identification Number (MSIN). In a 5G communication system, an IMSI is referred to as a Subscription Permanent Identifier (SUPI). In the case of an IMSI as a SUPI, the MSIN provides the subscriber identity. Thus, only the MSIN portion of the IMSI typically needs to be encrypted. The MNC and MCC portions of the IMSI provide routing information, used by the serving network to route to the correct home network. When the MSIN of a SUPI is encrypted, it is referred to as a Subscription Concealed Identifier (SUCI).

The access point 104 is illustratively part of an access network of the communication system 100. Such an access network comprises, for example, a 5G System having a plurality of base stations and one or more associated radio network control functions. The base stations and radio network control functions in some embodiments are logically separate entities, but in some embodiments are implemented in the same physical network element, such as, for example, a base station router or femto cellular access point.

The access point 104 in this illustrative embodiment is operatively coupled to mobility management functions 106. In a 5G network, the mobility management function is implemented by an Access and Mobility Management Function (AMF). A Security Anchor Function (SEAF) in some embodiments is also implemented with the AMF connecting a UE with the mobility management function. A mobility management function, as used herein, is the element or function (i.e., entity) in the core network (CN) part of the communication system that manages or otherwise participates in, among other network operations, access and mobility (including authentication/authorization) operations with the UE (through the access point 104). The AMF is also referred to herein, more generally, as an access and mobility management entity.

The AMF 106 in this illustrative embodiment is operatively coupled to home subscriber functions 108, i.e., one or more functions that are resident in the home network of the subscriber. As shown, some of these functions include the Unified Data Management (UDM) function, as well as an Authentication Server Function (AUSF). The AUSF and UDM (separately or collectively) are also referred to herein, more generally, as an authentication entity. In addition, home subscriber functions include, but are not limited to, Network Slice Selection Function (NSSF), Network Exposure Function (NEF), Network Repository Function (NRF), Policy Control Function (PCF), and Application Function (AF).

One important point to note is that in an SBA communication system, such as a 5G system, the control plane uses a services model approach in which components (NFs) query the NRF to discover and communicate with each other over application programming interfaces (APIs). The NF services discovery and authorization method will be described in further detail below.

The access point 104 is also operatively coupled to a serving gateway function, i.e., Session Management Function (SMF) 110, which is operatively coupled to a User Plane Function (UPF) 112. UPF 112 is operatively coupled to a Packet Data Network, e.g., Internet 114. As is known in 5G and other communication networks, the user plane (UP) or data plane carries network user traffic while the control plane (CP) carries signaling traffic. SMF 110 supports functionalities relating to UP subscriber sessions, e.g., establishment, modification and release of PDU sessions. UPF 112 supports functionalities to facilitate UP operations, e.g., packet routing and forwarding, interconnection to the data network (e.g., 114 in FIG. 1), policy enforcement, and data buffering.

It is to be appreciated that FIG. 1 is a simplified illustration in that not all communication links and connections between NFs and other system elements are illustrated in FIG. 1. One ordinarily skilled in the art given the various 3GPP TSs/TRs will appreciate the various links and connections not expressly shown or that may otherwise be generalized in FIG. 1.

Further typical operations and functions of certain network elements are not described herein in detail when they are not the focus of illustrative embodiments but can be found in appropriate 3GPP 5G documentation. It is to be appreciated that the particular arrangement of system elements in FIG. 1 is an example only, and other types and arrangements of additional or alternative elements can be used to implement a communication system in other embodiments. For example, in other embodiments, the system 100 comprises other elements/functions not expressly shown herein. Also, although only single elements/functions are shown in the FIG. 1 embodiment, this is for simplicity and clarity of illustration only. A given alternative embodiment may include larger numbers of such system elements, as well as additional or alternative elements of a type commonly associated with conventional system implementations.

It is also to be noted that while FIG. 1 illustrates system elements as singular functional blocks, the various subnetworks that make up the 5G network are partitioned into so-called network slices. Network slices (network partitions) comprise a series of network function (NF) sets (i.e., function chains) for each corresponding service type using network function virtualization (NFV) on a common physical infrastructure. The network slices are instantiated as needed for a given service, e.g., eMBB service, massive IoT service, and mission-critical IoT service. A network slice or function is thus instantiated when an instance of that network slice or function is created. In some embodiments, this involves installing or otherwise running the network slice or function on one or more host devices of the underlying physical infrastructure. UE 102 is configured to access one or more of these services via gNB 104. NFs can also access services of other NFs.

Figure 2:
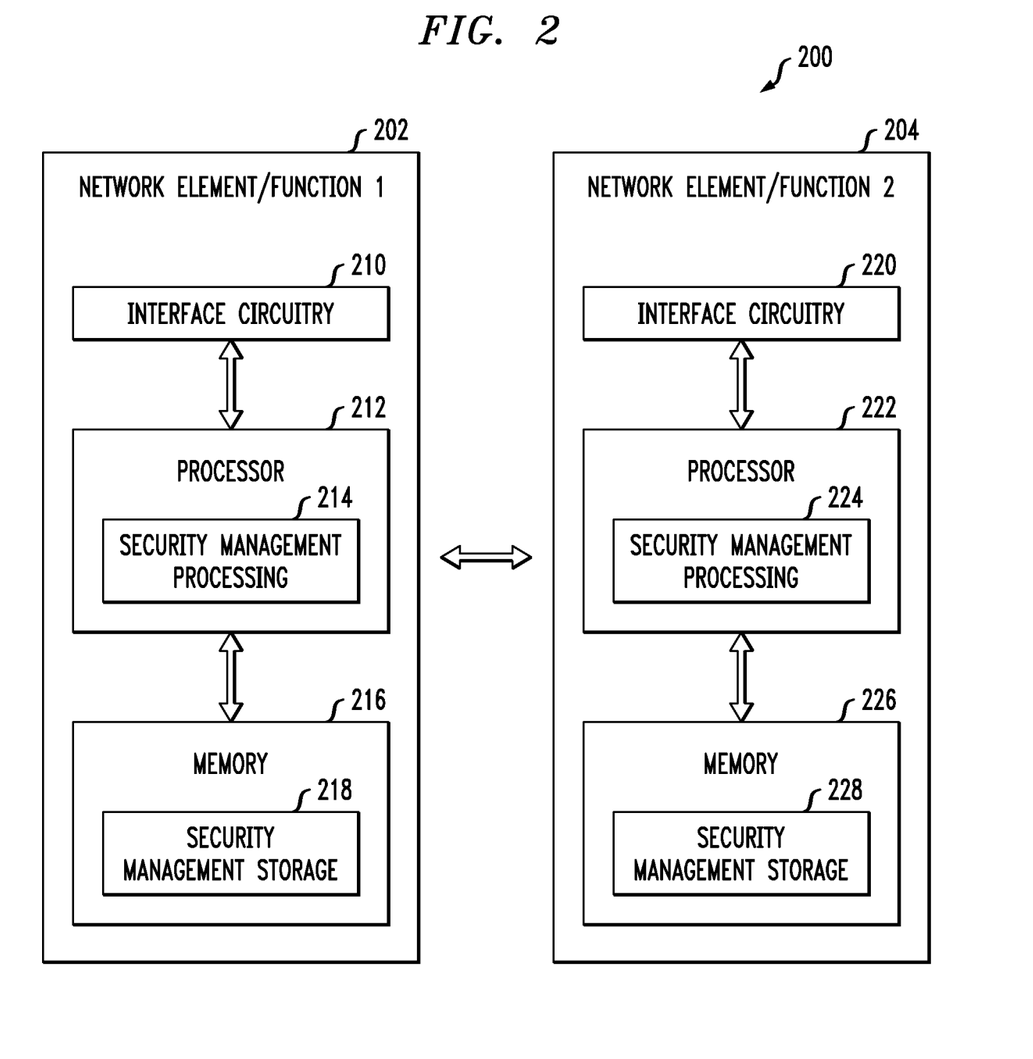
FIG. 2 illustrates network elements/functions for providing security management with which one or more illustrative embodiments are implemented.

FIG. 2 is a block diagram of network elements/functions for providing security management in an illustrative embodiment. System 200 is shown comprising a first network element/function 202 and a second network element/function 204. It is to be appreciated that the network elements/functions 202 and 204 represent any network elements/functions that are configured to provide security management and other techniques described herein, for example, but not limited to, AMF, SEAF, UDM, AUSF, NSSF, NEF, NRF, PCF and AF. In one or more illustrative embodiments, network elements/functions 202 and 204 represent one or the other of an edge proxy such as a Security Edge Protection Proxy (SEPP) and an Internetwork Packet Exchange (IPX) node, each of which will be described in further detail below. In one or more illustrative embodiments, the SEPP or edge proxy is referred to as a "security proxy element" and the IPX node as an "internetwork exchange element."

The network element/function 202 comprises a processor 212 coupled to a memory 216 and interface circuitry 210. The processor 212 of the network element/function 202 includes a security management processing module 214 that may be implemented at least in part in the form of software executed by the processor. The processing module 214 performs security management described in conjunction with subsequent figures and otherwise herein. The memory 216 of the network element/function 202 includes a security management storage module 218 that stores data generated or otherwise used during security management operations.

The network element/function 204 comprises a processor 222 coupled to a memory 226 and interface circuitry 220. The processor 222 of the network element/function 204 includes a security management processing module 224 that may be implemented at least in part in the form of software executed by the processor 222. The processing module 224 performs security management described in conjunction with subsequent figures and otherwise herein. The memory 226 of the network element/function 204 includes a security management storage module 228 that stores data generated or otherwise used during security management operations.

The processors 212 and 222 of the respective network elements/functions 202 and 204 may comprise, for example, microprocessors, application-specific integrated circuits (ASICs), field programmable gate arrays (FPGAs), digital signal processors (DSPs) or other types of processing devices or integrated circuits, as well as portions or combinations of such elements. Such integrated circuit devices, as well as portions or combinations thereof, are examples of "circuitry" as that term is used herein. A wide variety of other arrangements of hardware and associated software or firmware may be used in implementing the illustrative embodiments.

The memories 216 and 226 of the respective network elements/functions 202 and 204 may be used to store one or more software programs that are executed by the respective processors 212 and 222 to implement at least a portion of the functionality described herein. For example, security management operations and other functionality as described in conjunction with subsequent figures and otherwise herein may be implemented in a straightforward manner using software code executed by processors 212 and 222.

A given one of the memories 216 or 226 may therefore be viewed as an example of what is more generally referred to herein as a computer program product or still more generally as a processor-readable storage medium that has executable program code embodied therein. Other examples of processor-readable storage media may include disks or other types of magnetic or optical media, in any combination. Illustrative embodiments can include articles of manufacture comprising such computer program products or other processor-readable storage media.

The memory 216 or 226 may more particularly comprise, for example, an electronic random-access memory (RAM) such as static RAM (SRAM), dynamic RAM (DRAM) or other types of volatile or non-volatile electronic memory. The latter may include, for example, non-volatile memories such as flash memory, magnetic RAM (MRAM), phase-change RAM (PC-RAM) or ferroelectric RAM (FRAM). The term "memory" as used herein is intended to be broadly construed, and may additionally or alternatively encompass, for example, a read-only memory (ROM), a disk-based memory, or other type of storage device, as well as portions or combinations of such devices.

The interface circuitries 210 and 220 of the respective network elements/functions 202 and 204 illustratively comprise transceivers or other communication hardware or firmware that allows the associated system elements to communicate with one another in the manner described herein.

It is apparent from FIG. 2 that network element/function 202 is configured for communication with network element/function 204 and vice-versa via their respective interface circuitries 210 and 220. This communication involves network element/function 202 sending data to the network element/function 204, and the network element/function 204 sending data to the network element/function 202. However, in alternative embodiments, other network elements may be operatively coupled between, as well as to, the network elements/functions 202 and 204. The term "data" as used herein is intended to be construed broadly, so as to encompass any type of information that may be sent between network elements/functions (as well as between user equipment and a core network) including, but not limited to, messages, tokens, identifiers, keys, indicators, user data, control data, etc.

It is to be appreciated that the particular arrangement of components shown in FIG. 2 is an example only, and numerous alternative configurations are used in other embodiments. For example, any given network element/function can be configured to incorporate additional or alternative components and to support other communication protocols.

Figure 3:
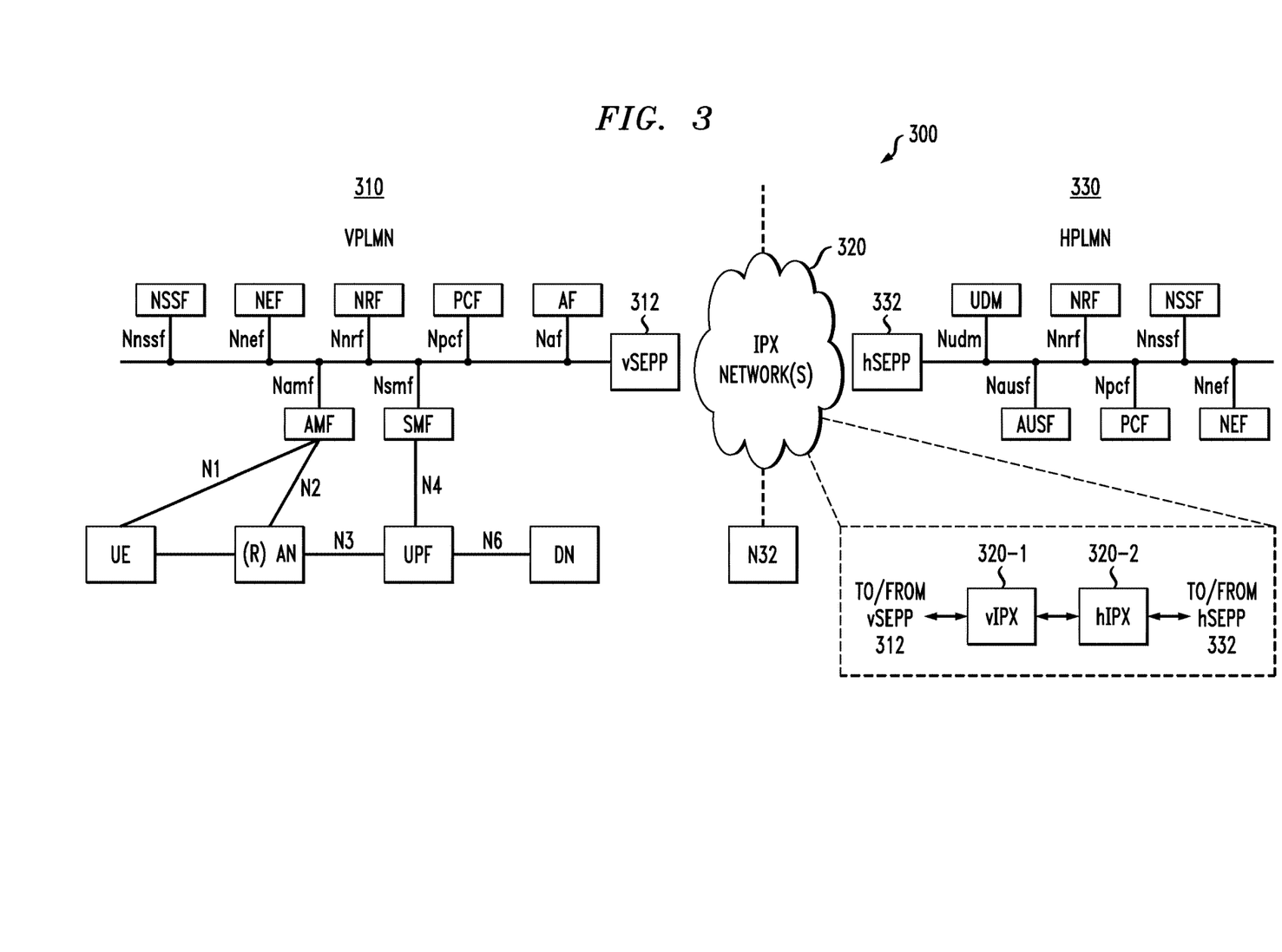
FIG. 3 illustrates a communication system architecture with network functions interacting between and within a visited network and a home network with which one or more illustrative embodiments are implemented.

Other system elements such as UE 102 and gNB 104 may each also be configured to include components such as a processor, memory and network interface. These elements need not be implemented on separate stand-alone processing platforms, but could instead, for example, represent different functional portions of a single common processing platform. FIG. 3 depicts a 5G architecture 300 in a configuration comprising a visited public land mobile network (VPLMN) 310 operatively coupled via an intermediate Internetwork Packet Exchange (IPX) network 320 to a home public land mobile network (HPLMN) 330. An IPX network such as 320 comprises one or more IPX nodes through which data is transferred between VPLMN 310 and HPLMN 330. FIG. 3 also illustrates the presence of a Security Edge Protection Proxy (SEPP) at the edge of each PLMN, i.e., vSEPP 312 in VPLMN 310 and hSEPP 332 in HPLMN 330.

Note that there can be more than one IPX network operatively coupled between VPLMN 310 and HPLMN 330. For example, in the exploded view of IPX network 320 (denoted by the dashed outline box in FIG. 3), there are two IPX networks shown. vIPX 320-1 is the trusted IPX network associated with vSEPP 312, while hIPX 320-2 is the trusted IPX network associated with hSEPP 332. Also, as illustrated in FIG. 3, vIPX 320-1 and hIPX 320-2 may each be considered an IPX node or internetwork exchange element.

Figure 4:
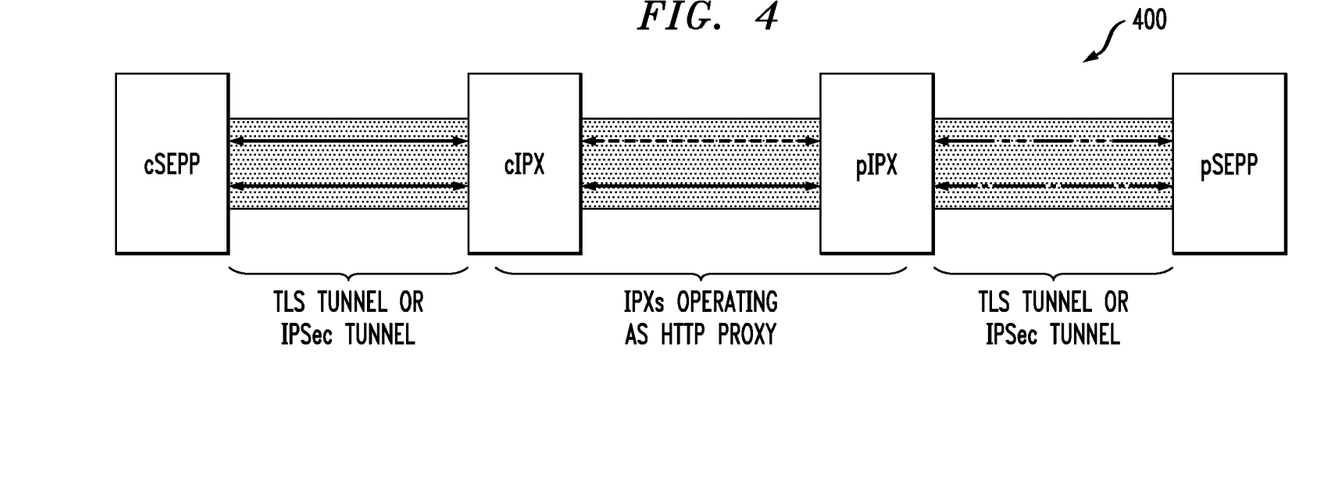
FIG. 4 illustrates a methodology for security management between an edge proxy and an internetwork exchange node, according to an illustrative embodiment.
Figure 5:
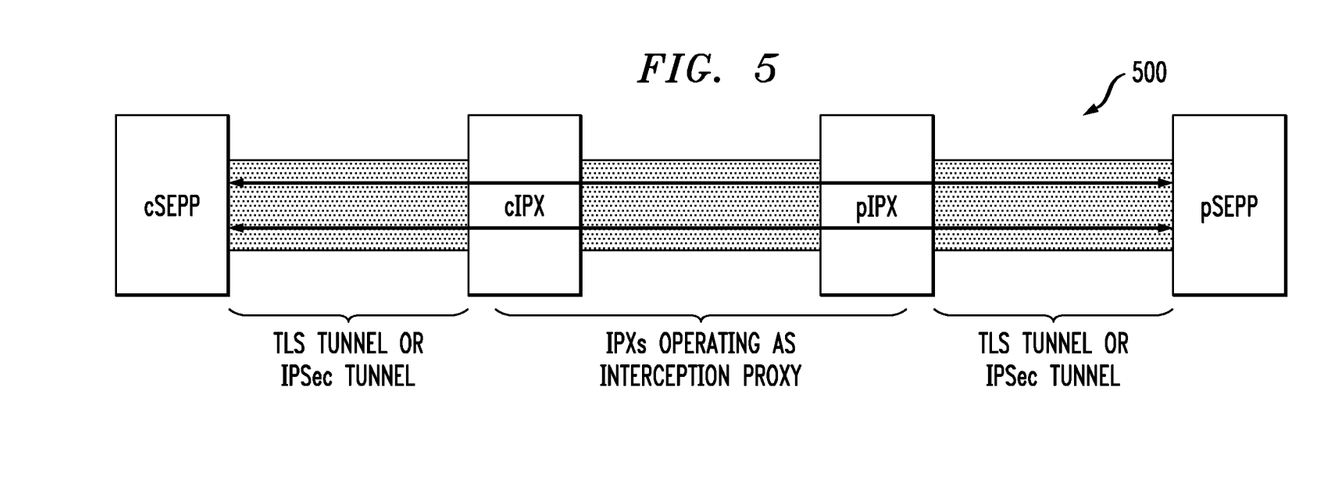
FIG. 5 illustrates a methodology for security management between an edge proxy and an internetwork exchange node, according to another illustrative embodiment.
Figure 6:
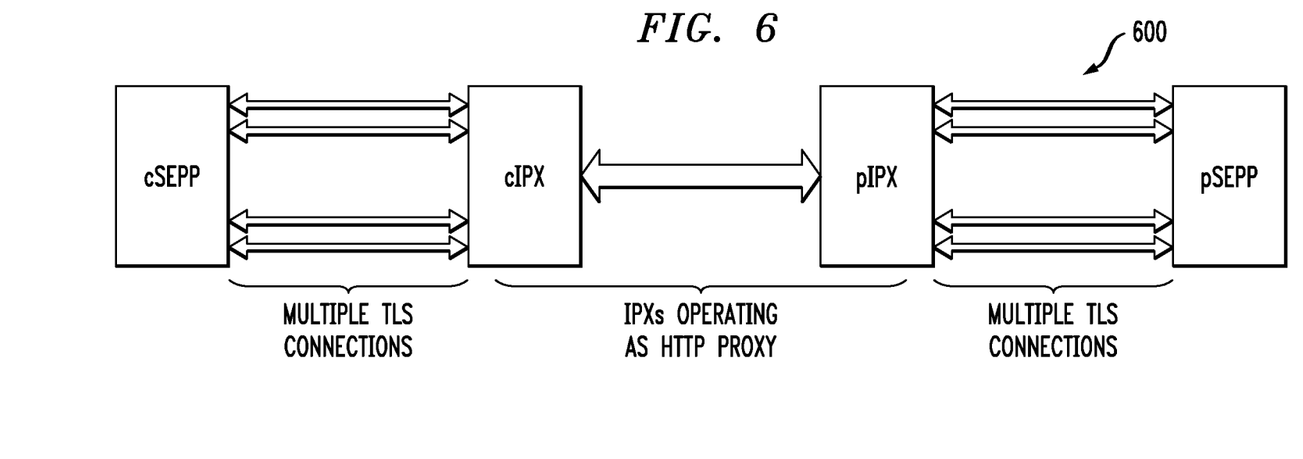
FIG. 6 illustrates a methodology for security management between an edge proxy and an internetwork exchange node, according to yet another illustrative embodiment.

Still further, when an NF (e.g., AMF) in VPLMN 310 initiates service access to an NF (e.g., AUSF) in HPLMN 330, the NF in VPLMN 310 may be referred to as a "service consumer" and the NF in HPLMN 330 as a "service producer." In such cases, vSEPP 312 and vIPX 320-1 may be referred to, respectively, as cSEPP and cIPX (where "c" refers to consumer), while hSEPP 332 and hIPX 320-2 may be referred to, respectively, as pSEPP and pIPX (where "p" refers to producer). FIGS. 4-6 refer to the SEPPs and IPX nodes with the consumer/producer (c/p) nomenclature.

It is to be appreciated that the various network functions shown in the VPLMN 310 and the HPLMN 330 are known and described in detail in various 5G specifications such as, but not limited to, the above-referenced TS 23.501 and TS 33.501.

As mentioned above, in 5G, SBA is introduced to model services as network functions (NFs) that communicate with each other using RESTful application programming interfaces (Representational State Transfer APIs). In the scenario where the two communicating NFs are in two different PLMNs (e.g., VPLMN 310 and HPLMN 330), communication happens over a roaming inter-network interface (N32) between the two participating PLMNs.

To protect NF specific content in the messages that are sent over the roaming interface, the SEPP is introduces as the entity residing at the perimeter of the PLMN network and acting as a gateway that protects all the traffic going out of the network. The SEPP implements Application Layer Security (ALS) for all the data exchanged between two internetwork NFs at the service layer. ALS involves protecting information transmitted in various parts of the HyperText Transfer Protocol (HTTP) message, including HTTP Request/Response Line, HTTP headers and HTTP Payload. Protection mechanisms include confidentiality protection, integrity protection or a combination of both. Once the SEPP protects the HTTP message from the NF within the PLMN, it uses a SEPP-SEPP HTTP POST message to send the protected information across the N32 interface to the remote SEPP.

The N32 interface may have up to two IPX network providers (as mentioned above in the context of FIG. 3), each trusted by one of the SEPPs, that are authorized by the SEPPs to modify some attribute values in the HTTP message. The two IPX providers (nodes) provide mediation services requiring modifications of the HTTP POST message transported over the N32 interface.

Security aspects between SEPP and IPX, and its overall impact on SEPP functionality, are not provided for in the existing 5G SBA architecture. Given the general concepts described above, illustrative embodiments that address SEPP and IPX security management issues will now be described. More particularly, illustrative embodiments provide improved security management techniques for 5G systems. The architecture for 5G systems is currently being standardized in 3GPP. As mentioned above, 3GPP TS 23.501 defines the 5G system architecture as service-based, e.g., Service-Based Architecture (SBA), while 3GPP TS 33.501 defines security management details.

Illustrative embodiments realize that connection between a SEPP and the authorized IPX node is insecure and thus prone to attacks. This connection/link should be cryptographically secured. In addition, the IPX node should be authenticated before the SEPP can forward the HTTP POST message, which it generates from the received HTTP message from an internal network function, towards the IPX node. Furthermore, illustrative embodiments realize that the mechanism or the mode in which the IPX node operates has a bearing on how the SEPP constructs and transmits the HTTP POST message towards the IPX node. Illustrative embodiments provide solutions that address these and other aspects of security between the SEPP and the IPX node.

More particularly, illustrative embodiments provide for multiple mechanisms to solve the issue of communication security of the link between the SEPP and the IPX node and authentication of the IPX node:

a. Setup a virtual private network or VPN (e.g., either Transport Layer Security (TLS) based or Internet Protocol Security (IPSec)) to provide a secure tunnel between the SEPP and the IPX node. This approach provides security of the connection as well as IPX node authentication. The SEPP creates as many HTTP connections as required to carry HTTP messages. HTTP connections are carried over the established VPN tunnel.

b. Use Hyper Text Transfer Protocol Secure (HTTPS) to set up a TLS connection between the SEPP and the IPX node for each HTTP connection. There will be as many TLS connections as there are HTTP connections. The SEPP uses the HTTPS scheme to establish the TLS connection with the IPX node and send HTTP messages securely. This approach necessitates the IPX node to have wildcard certificates and functionality to modify NF hostnames (e.g., fully qualified domain name or FQDN) in the NF discovery response message.

Furthermore, illustrative embodiments provide multiple methods of operation of an IPX node:

a. As a HTTP proxy in which the IPX node terminates the HTTP/TCP (Transmission Control Protocol) connection from the SEPP.

b. As an interception proxy (e.g., man-in-the-middle or MITM) that inspects all HTTP traffic and modifies attribute values in-band.

In illustrative embodiments, the above-mentioned sets of mechanism and methods of operation are combined to provide three implementations for security between the SEPP and the IPX node:

1. VPN established with the IPX node operating as HTTP proxy.
2. VPN established with the IPX node operating as interception proxy.
3. TLS connection for every HTTP connection, with authentication based on a wildcard certificate(s).

In accordance with one or more illustrative embodiments, SEPP/IPX node security management will be explained as comprising five parts. However, it is to be appreciated that portions of any given part may be performed in one or more of the other parts, and security management according to alternative embodiments may be considered as having less or more parts than the five illustratively delineated herein.

Part 1: Communication Security Between SEPP and Authorized IPX

Communication security between the SEPP and the authorized IPX node can be achieved in multiple ways:

1. Protection using IPSec VPN tunnel.
   IPSec VPN established between the SEPP and the IPX node. Mutual authentication is performed in this process.
   The SEPP generates HTTP messages (scheme is HTTP, not HTTPS) to carry HTTP messages between the SEPP and the IPX node.
   HTTP messages are carried in the IPSec tunnel, protected between the SEPP and the IPX node.
2. Protection using TLS VPN tunnel
   Same as above in 1., but a TLS VPN is established between the SEPP and the IPX node.
   The TLS VPN tunnel protects all HTTP messages between the SEPP and the IPX node.
3. HTTPS between the SEPP and the IPX node (separate TLS session per HTTP connection).
   In this mode, the SEPP uses HTTPS to send messages over the N32 interface.
   A TLS connection is established between the SEPP and the IPX node for every HTTP POST message initiated by the SEPP.
   The IPX node is provisioned with a wildcard certificate (in order for the TLS handshake to succeed).
   In addition, the IPX node modifies the target NF FQDN in the NF Discovery Response message to create a new FQDN that allows the SEPP to establish a TLS connection at a per HTTP connection level.

The SEPP uses the new FQDN in the target uniform resource identifier (URI) field of the HTTP POST message.

Part 2: HTTP Scheme Used by the Sending SEPP (e.g., cSEPP)

Depending on how the communication layer security is established between the SEPP and the IPX node, the SEPP uses either the HTTP scheme or the HTTPS scheme when it generates the POST message with the protected payload.

a. If VPN technology (TLS or IPSec) is used, the SEPP uses the HTTP scheme with the "authority" component pointing to the destination SEPP. All HTTP traffic is sent in one or more HTTP connections on this VPN interface.
   b. If TLS is required to be used for each HTTP connection, the SEPP uses the HTTPS scheme to establish separate TLS connection for each HTTP connection it establishes between itself and the IPX node. The "authority" component in the target URI includes the modified FQDN that allows the TLS handshake to succeed.

Part 3: Mode in which the IPX Node Operates

The trusted IPX provider may operate either as a HTTP proxy or as an interception proxy.

a. When the IPX node is operating as a HTTP proxy, the TCP connection from the sending SEPP (cSEPP) terminates in the IPX node. HTTP messages are processed by the IPX node before they are forwarded to the next hop.
   b. When the IPX node is operating as an interception proxy, the TCP connection is setup end-to-end between two SEPPs, but the IPX node intercepts and modifies the cleartext part of the message. Effectively, the IPX node is operating as a MITM entity.

IPX Operating as HTTP Proxy

When the IPX node is operating as a HTTP proxy, it terminates HTTP/TCP connections from the sending SEPP (cSEPP).

The "authority" component of the Target URI in the HTTP message points to target SEPP (pSEPP).
   The HTTP/TCP connection from the sending SEPP (cSEPP) terminates in the IPX node.
   The IPX node (cIPX) will setup a different HTTP/TCP connection to the next hop, which may be another IPX (pIPX) or the receiving SEPP (pSEPP).
   The HTTP connections are per-hop specific (i.e., different in each hop).
   Therefore, the HTTP message from the SEPP may be carried in different HTTP streams in every hop between two SEPPs. There is no concept of end-to-end HTTP streams.

IPX Operating as an Interception Proxy

When the IPX node is operating as an interception proxy, the HTTP traffic between two SEPPs pass through the IPX node.

There is an end-to-end TCP connection between two SEPPs as the HTTP connection exists directly between two SEPPs.
   The unencrypted part of the HTTP payload is available in cleartext to the IPX node. Thus, the IPX node can see and modify authorized attributes in the HTTP message.
   Streams, that carry HTTP Request/Response in a HTTP connection, are end-to-end between two SEPPs.
   There is hop-by-hop protection, therefore HTTP messages are protected.

Part 4: Security Between SEPP and IPX Node

By combining parts 1, 2 and 3, this part looks at three different implementations for security between a SEPP and its authorized IPX node.

Implementation 1: IPX is a HTTP Proxy, with VPN Tunnel-Based Security Between it and the SEPP In this implementation 400, as shown in FIG. 4, security between CSEPP and cIPX is provided by either a TLS based tunnel or an IPSec tunnel. IPX nodes (cIPX and pIPX) are operating as a HTTP proxy.

Aspects of this implementation comprise:

1. HTTP/TCP connection(s) established between SEPP and IPX. Independent HTTP/TCP connections in each hop. In FIG. 4, each bi-directional arrow depicts independent HTTP/TCP connections.
  2. Each HTTP/2 connection contains multiple concurrently-open streams. HTTP/2 is the revised HTTP protocol as described in 3GPP Request for Comment (RFC) 7540, "Hypertext Transfer Protocol Version 2 (HTTP/2)," May 2105, the disclosure of which is incorporated by reference herein in its entirety.
  3. One HTTP/2 stream used per HTTP Request/Response communication. The stream identifier (Id) is unique for each HTTP/2 connection. For a given HTTP Request/Response communication, the stream used in a HTTP/2 connection between hops may be completely different. In other words, stream identifiers may be different, and therefore cannot be relied upon for end-to-end (e2e) identification of the HTTP/2 Request/Response message.
  4. As per 3GPP TS 29.500 clause 5.2.6, the disclosure of which is incorporated by reference herein in its entirety, more than one HTTP/2 connection shall be used between two communicating entities in order to load balance the requests as well as to avoid simultaneous exhaustion of HTTP stream IDs. When the stream ID space of a particular HTTP/2 connection is nearing exhausted, a new HTTP/2 connection shall be dynamically created between two endpoints.
  5. In the HTTP/2 message transmitted by the sending SEPP, the "authority" component of the Target URI points to the target SEPP.
  6. The URI scheme used for the N32-f forwarding API shall be HTTP and not HTTPS.

Implementation 2: IPX is an Interception Proxy, with VPN Tunnel-Based Security Between it and the SEPP In this implementation 500, as shown in FIG. 5, security between CSEPP and cIPX is provided by either a TLS based tunnel or an IPSec tunnel. IPX nodes (cIPX and pIPX) are operating as an interception proxy.

Aspects of this implementation comprise:

1. HTTP/TCP connection(s) established end-to-end between cSEPP and pSEPP. In FIG. 5, two HTTP/TCP connections are established between cSEPP and pSEPP.
  2. Each HTTP/2 connection contains multiple concurrently-open streams.
  3. One HTTP/2 steam per HTTP/2 Request/Response communication. Since an HTTP/2 connection is end-to-end, the same stream is used to carry HTTP Request/Response communication between two SEPPs. The stream ID therefore is end-to-end, and unique for a given HTTP/2 connection between a pair of SEPPs.
  4. As per the above-mentioned 3GPP TS 29.500 clause 5.2.6, more than one HTTP/2 connection shall be used between two communicating entities to load balance the requests as well as to avoid simultaneous exhaustion of HTTP stream IDs. When the stream ID space of a HTTP/2 connection is nearing exhausted, a new HTTP/2 connection shall be dynamically created between two endpoints.
5. In the HTTP message transmitted by the sending SEPP, the "authority" component of the Target URI points to the target SEPP.
6. The URI scheme used for the N32-f forwarding API in a SEPP shall be HTTP and not HTTPS.

Implementation 3: Wildcard Certificate Used to Establish TLS Between SEPP and Authorized IPX In this implementation 600, as shown in FIG. 6, a separate TLS connection is established for every HTTP connection by:
  a) wildcard certificate used by cIPX
  b) cIPX appends its wildcard domain name to target NF's FQDN.

Aspects of this implementation comprise:
1. The cIPX has a wildcard certificate with the subject set to a wildcard domain name, e.g., "*.cIPX.own_network.tld".
2. For every target Network Function FQDN, the cIPX creates a new FQDN as follows:
   a. The cIPX intercepts the "NF Discovery response" message from the home PLMN (3GPP TS 23.502 clause 4.17.5, the disclosure of which is incorporated by reference in its entirety-NF/NF service discovery across PLMNs) that contains the target Network Function's FQDN, and rewrites target NF's FQDN to a new FQDN with cIPX's wildcard domain name appended to the end of the original FQDN (e.g., "target NF FQDN.cIPX.own_network_tld").
   b. The cIPX forwards the modified NF Discovery response (which now includes the new FQDN) to cSEPP, which further forwards it to its NRF.
   c. The new FQDN always resolves to the IP address of the cIPX.
3. When the SEPP generates a HTTP POST with the "host" subcomponent in the "authority" component in target URI set to the modified FQDN of the target NF and uses HTTPS scheme to setup a TLS connection to the IP address of the cIPX.
   a. During TLS handshake, cIPX provides its wildcard certificate to cSEPP.
   b. The cSEPP authenticates cIPX using its wildcard certificate.
4. When the cIPX receives the HTTP message, it rewrites the hostname in the HTTP request back to its original value as obtained in step 2.a.
   a. The cIPX maintains an association of the modified FQDN to the actual FQDN.

Part 5: Selection of Security Options by SEPP

Illustrative embodiments provide for the SEPPs to be equipped with the functionality to select an appropriate security mechanism between itself and the authorized IPX node.

The SEPPs are provisioned with security implementations (as options) described above in Part 4. As part of the initial handshake, a SEPP negotiates with the IPX node to select an appropriate security mechanism to apply on the communication link. HTTP based signalling is used between the SEPP and IPX node to obtain security capabilities from the other entity and negotiate a suitable security mechanism.

As another embodiment, the SEPP is provisioned with the selected security mechanism and thus there is no negotiation required with the IPX node.

The security mechanism between the SEPP and the IPX node may also be dynamically updated or changed either with a change in the provisioning or by dynamic negotiation.

In illustrative embodiments, different options of notification (indication) are contemplated to enable SEPP/IPX security mechanism selection to be dynamic. The IPX provider/node notifies the SEPP which option to use (i.e., option 1 or option 2 below or, depending on operator agreement, any other option defined in the future). The SEPP is configured to support the plurality of options to be flexible with several IPX providers or to allow changes with an earlier established configuration. In one embodiment, selectable security management options comprise:
  Option 1: Indication triggers the sending SEPP to create a TCP connection that terminates in the IPX node.
  Option 2: Indication triggers the sending SEPP to initiate TCP connection with receiving SEPP directly.

The IPX node is configured to record the option to be used with the SEPP and performs one of the following:
  When option 1 is selected: IPX node processes HTTP messages before forwarding them to the next hop.
  When option 2 is selected: IPX node can intercept and modify cleartext part of the message.

Figure 7:
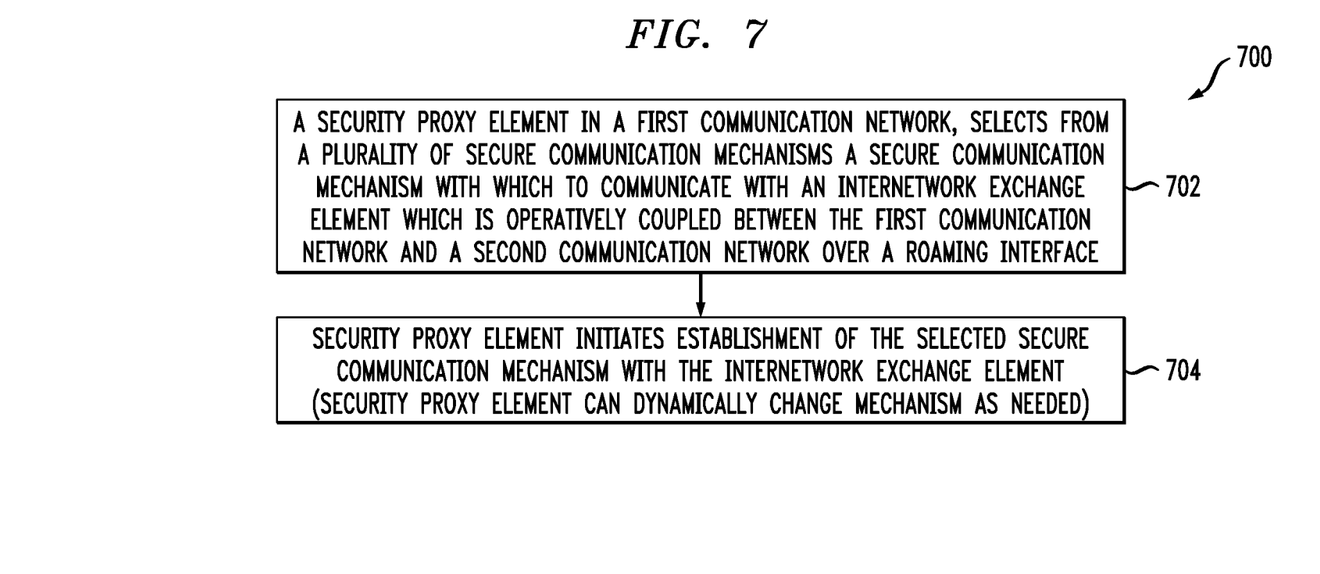
FIG. 7 illustrates a methodology for selection of security management between an edge proxy and an internetwork exchange node, according to another illustrative embodiment.

FIG. 7 illustrates a methodology 700 for selection of security management between an edge proxy and an internetwork packet exchange node, according to another illustrative embodiment.

As shown in step 702, a security proxy element (e.g., SEPP) in a first communication network, selects from a plurality of secure communication mechanisms (e.g., options described above) a secure communication mechanism with which to communicate with an internetwork exchange element (e.g., IPX node) which is operatively coupled between the first communication network and a second communication network over a roaming interface. Note that the SEPP that selects and initiates the secure communication mechanism can be in the VPLMN or HPLMN depending on the direction of message flow. Each SEPP independently establishes security with its authorized internetwork exchange element before they can talk to each other.

In step 704, the security proxy element initiates establishment of the selected secure communication mechanism with the internetwork exchange element.

The particular processing operations and other system functionality described in conjunction with the message flow diagrams of FIGS. 4-7 are presented by way of illustrative example only, and should not be construed as limiting the scope of the disclosure in any way. Alternative embodiments can use other types of processing operations and messaging protocols. For example, the ordering of the steps may be varied in other embodiments, or certain steps may be performed at least in part concurrently with one another rather than serially. Also, one or more of the steps may be repeated periodically, or multiple instances of the methods can be performed in parallel with one another.

It should therefore again be emphasized that the various embodiments described herein are presented by way of illustrative example only and should not be construed as limiting the scope of the claims. For example, alternative embodiments can utilize different communication system configurations, user equipment configurations, base station configurations, key pair provisioning and usage processes, messaging protocols and message formats than those described above in the context of the illustrative embodiments. These and numerous other alternative embodiments within the scope of the appended claims will be readily apparent to those skilled in the art.

We claim:

1. A method comprising:
    initiating establishment of a secure tunnel by a first security edge protection proxy element in a first public land mobile network with a first internetwork exchange element which is operatively coupled between the first public land mobile network and a second public land mobile network over a roaming interface, the roaming interface comprising the first internetwork exchange element trusted by the first security edge protection proxy element and a second internetwork exchange element trusted by a second security edge protection proxy element in the second public land mobile network;
    generating, by the first security edge protection proxy element, a target uniform resource identifier for a message to be delivered from a first network entity in the first public land mobile network to a second network entity in the second public land mobile network, an authority component of the target uniform resource identifier pointing to the second security edge protection proxy element; and
    upon establishment of the secure tunnel, sending the message utilizing the generated target uniform resource identifier from the first security edge protection proxy element to the first internetwork exchange element over the secure tunnel.

2. The method of claim 1, wherein the secure tunnel comprises a virtual private network (VPN) tunnel.

3. The method of claim 1, wherein the first security edge protection proxy element is further configured to create one or more hypertext-based transfer protocol connections for one or more hypertext-based transfer protocol messages, wherein the one or more hypertext-based transfer protocol connections are carried over the secure tunnel.

4. The method of claim 3, wherein the hypertext-based transfer protocol is the HTTP protocol.

5. The method of claim 1, wherein initiation of establishment of the secure tunnel is performed via a transport layer-based security protocol.

6. The method of claim 5, wherein the transport layer-based security protocol is the TLS protocol.

7. The method of claim 1, wherein initiation of establishment of the secure tunnel is performed via a network layer-based security protocol.

8. The method of claim 7, wherein the network layer-based security protocol is the IPsec protocol.

9. The method of claim 3, wherein the first internetwork exchange element functions as an HTTP proxy in which the first internetwork exchange element terminates the one or more hypertext-based transfer protocol connections.

10. The method of claim 3, wherein the first internetwork exchange element functions as an interception proxy in which the first internetwork exchange element is a pass-through for the one or more hypertext-based transfer protocol connections which are setup end-to-end between the first security edge protection proxy element and the second security edge protection proxy element.

11. A method comprising:
    initiating establishment of one or more transport layer-based security connections, using a secure hypertext-based transfer protocol, by a first security edge protection proxy element in a first public land mobile network with a first internetwork exchange element which is operatively coupled between the first public land mobile network and a second public land mobile network over a roaming interface, the roaming interface comprising the first internetwork exchange element trusted by the first security edge protection proxy element and a second internetwork exchange element trusted by a second security edge protection proxy element in the second public land mobile network, wherein each of the one or more transport layer-based security connections corresponds to one or more hypertext-based transfer protocol connections;
    generating, for at least a given one of one or more messages to be delivered from a first network entity in the first public land mobile network to a second network entity in the second public land mobile network, a modified hostname by appending a wildcard domain name of the first internetwork exchange element to a hostname of the second network entity;
    generating, by the first security edge protection proxy element for the given message to be delivered from the first network entity in the first public land mobile network to the second network entity in the second public land mobile network, a target uniform resource identifier comprising the modified hostname; and
    upon establishment of the one or more transport layer-based security connections, sending the one or more messages corresponding to the one or more hypertext-based transfer protocol connections from the first security edge protection proxy element to the first internetwork exchange element over the one or more transport layer-based security connections, wherein sending the given one of the one or more messages utilizes the generated target uniform resource identifier.

12. The method of claim 11, wherein authentication of the first internetwork exchange element is performed via one or more wildcard certificates that belong to the first internetwork exchange element.

13. The method of claim 11, wherein the one or more transport layer-based security connections are one or more TLS connections.

14. The method of claim 11, wherein the secure hypertext-based transfer protocol is the HTTPS protocol.

15. The method of claim 11, wherein the one or more hypertext-based transfer protocol connections are HTTP connections.

16. The method of claim 11, wherein the first internetwork exchange element functions as an HTTP proxy.

* * * * *